United States Patent [19]
Dapo

[11] Patent Number: 5,111,365
[45] Date of Patent: May 5, 1992

[54] ELECTROLYTIC CAPACITOR PROVIDED WITH A LOW RESISTIVITY ELECTROLYTE

[75] Inventor: Roland F. Dapo, Columbia, S.C.

[73] Assignee: U.S. Philips Corporation, New York, N.Y.

[21] Appl. No.: 717,958

[22] Filed: Jun. 20, 1991

[51] Int. Cl.$^5$ ............................................. H01G 9/02
[52] U.S. Cl. ................................... 361/506; 252/62.2
[58] Field of Search ............... 252/62.2, 506; 361/525, 361/526, 527; 29/25.03

[56] References Cited

U.S. PATENT DOCUMENTS

| | | | |
|---|---|---|---|
| 3,812,039 | 5/1974 | Niwa | 252/62.2 |
| 4,101,458 | 7/1978 | Taketani et al. | 252/62.2 |
| 4,823,236 | 4/1989 | Fresia | 361/506 |

*Primary Examiner*—Donald A. Griffin
*Attorney, Agent, or Firm*—Norman N. Spain

[57] ABSTRACT

An electrical capacitor having aluminum anode and cathode members separated by an insulating spacer impregnated with an electrolyte consisting of a solution containing from 50%–70% by weight of N-methylformamide, up to 30% by weight of 2-methoxyethanol, 2-ethoxyethanol, ethylene glycol or 1,2-propylene glycol, 12–20% by weight of an aromatic dicarboxylic acid selected from the group consisting of isophthalic acid and terephthalic acid, from 4%–10% by weight of dimethylamine or monomethylamine, the ratio of the amine to the dicarboxylic acid being less than 2.00:1 and greater than 1.67:1, up to 0.5% by weight of pelargonic acid, up to 0.1% by weight of phosphoric acid and up to 8% by weight of water.

10 Claims, No Drawings

ELECTROLYTIC CAPACITOR PROVIDED WITH A LOW RESISTIVITY ELECTROLYTE

BACKGROUND OF THE INVENTION

This invention relates to improved electrolytic capacitors and to electrolytes for use in such capacitors.

Recently, there has been an increase in the gain (capacity per geometric area) of the anode aluminum foil employed in electrolytic capacitors. Such an increase frequently will cause the equivalent series resistance (ESR) of a capacitor to exceed the design limit. In order to avoid this problem, it has become necessary to provide electrolytes for said capacitors having a very low resistivity. It is known that by use of dimethylformamide (DMF) as a solvent, electrolytes of relatively low resistivity (60 to 120 ohm cm at 30° C.) may be obtained. Also electrolytes of low resistivity ma be made using dimethylacetamide (DMAC) as the primary solvent.

However, both these solvents suffer from the disadvantage of being highly toxic, they both have low TLV values and both absorb through the skin.

Another approach has been to employ, as the main solvent, gamma butyrolactone. Electrolytes employing this solvent can exhibit a low resistivity. However this solvent suffers from the defect of being relatively expensive. Additionally, this solvent (gamma dutyrolactone) does not wet the paper fibers of the insulating spaces employed in electrolytic capacitors to the same extent as do most of the other capacitor solvents. As a result, it is necessary to use the more expensive manila fiber paper in order to ensure that a sufficient amount of the electrolyte is present so that the low resistivity of the electrolyte results in a capacitor having a low ESR.

Niwa et al, U.S. Pat. No. 3,812,039, shows an electrolyte for an electrolytic capacitor in which the solvent employed is the safe and relatively inexpensive solvent—N-methylformamide. The electrolyte shown therein contains, as a solute, a monoammonium, monoamine or monoalkali metal salt of isophthalic acid or maleic acid. However when the electrical electrolyte contains a monosalt of isophthalic acid the specific resistance of the electrolyte is too high for many purposes (250 ohm.cm at 25° C. Table 1).

When the solute employed is a monosalt of maleic acid the electrolyte exhibits a relatively low specific resistance at 25° C., 72 ohm.cm. However, it has been found that capacitors containing as an electrolyte a solution of a monosalt of maleate in N-methylformamide develops an undesirably high ESR when operated at high temperatures—85° C. and above.

U.K. Patent Specification 1269010 also shows an electrolyte for an electrolytic capacitor employing as a major solvent—N-methylformamide. However the solute employed is a dangerous and highly toxic salt of a polynitrophenol.

Chemical Abstracts 112-228252a discloses an electrolyte for an electrolytic capacitor containing N-methylformamide and diethylamine isophthalate in which the molar ratio of the amine to the isophthalic acid is 1:1. This electrolyte shows a higher resistivity than is desired, 160 ohm cm.

SUMMARY OF THE INVENTION

A principal object of this invention is to provide an electrolytic capacitor exhibiting a relatively low ESR and employing an electrolyte free of unsafe and expensive solvents.

According to the invention, a new and novel electrolytic capacitor of the invention comprises aluminum anode and cathode members separated by an insulating spacer impregnated with an electrolyte consisting essentially of a solution containing from about 50%-70% by weight of N-methylformamide, up to about 30% by weight of 2-methoxyethanol, 2-ethoxyethanol, ethylene glycol or 1, 2-propylene glycol, about 12-20% by weight of an aromatic dicarboxylic acid selected from the group consisting of isophthalic acid and terephthalic acid, from 4%-10% by weight of dimethylamine or monomethylamine, the mole ratio of the amine to the dicarboxylic acid being less than 2.00:1 and greater than 1.67:1, up to 0.5% by weight of pelargonic acid, up to 0.10% by weight of phosphoric acid and up to 8% by weight of water.

DETAILED DESCRIPTION OF THE INVENTION

The electrolyte of the invention preferably contains a glycol selected from the group consisting of ethylene glycol and diethylene glycol in an amount up to about 30% by weight, ethylene glycol being particularly preferred.

Water may be present in an amount up to 8% by weight, particularly good results being achieved with a water concentration of 3%-6% by weight.

While good results are achieved with the use of isophthalic or terephthalic acid it has been found that superior results have been obtained with the use of isophthalic acid. Best results have been achieved by the use of a combination of isophthalic acid and dimethylamine.

In order to reduce the cost of the electrolyte up to 25% of the isophthalic or terephthalic acid may be replaced by an equivalent of formic acid. However better results are achieved when the phthalic acids are used by themselves.

The pelargonic acid, which is used in an amount of up to 0.5% by weight, preferably is employed in an amount of 0.2–0.3% by weight. The pelargonic acid serves as a corrosion inhibitor and under some circumstances may be eliminated or replaced by volatile aliphatic monocarboxylic acids such as butyric, acetic or propionic acid. The volatile aliphatic monocarboxylic acids may be employed in an amount up to about 2% by weight.

The phosphoric acid preferably is employed in an amount of about 0.003%–0.008% by weight.

The invention will now be described in greater detail with reference to the following examples.

EXAMPLE 1

The following formulation was prepared:

| | |
|---|---|
| N-methylformamide | 56.00 wt. % |
| ethylene glycol | 16.00 |
| water | 4.50 |
| pelargonic acid | 0.25 |
| 85% phosphoric acid | .005 |
| isophthalic acid | 16.00 |
| dimethylamine | 7.25 |

These ingredients were mixed together. After all the ingredients were added the mixture was heated to 75°–85° C. to dissolve all the solids.

The properties of the resultant composition, measured at 30° C., were resistivity=90.3 ohm cm, pH=7.88.

The resistivity of this composition varied with temperature as follows:

| Temperature °C. | Resistivity, ohm-cm |
|---|---|
| 30 | 90.3 |
| 0 | 163 |
| −20 | 456 |
| −40 | 1990 |
| −55 | 7767 |

EXAMPLE 2

The following formulation was prepared

| | |
|---|---|
| N-methylformamide | 72.00 wt. % |
| water | 4.50 |
| pelargonic acid | 0.25 |
| 85% phosphoric acid | .005 |
| isophthalic acid | 16.00 |
| dimethylamine | 7.25 |

Here, no heating was required to dissolve the solids.
The properties of the resultant formulation, measured at 30° C., were resistivity=84.6 ohm.cm, pH=8.28.
The resistivity varied with temperature as follows:

| Temperature °C. | Resistivity, ohm-cm |
|---|---|
| 30 | 84.6 |
| 0 | 174 |
| −20 | 374 |
| −40 | 1211 |
| −55 | 100,000 (crystallization) |

EXAMPLE 3

The following formulation was prepared:

| | |
|---|---|
| N-methylformamide | 57.75 wt. % |
| ethylene glycol | 16.00 |
| water | 4.25 |
| pelargonic acid | 0.25 |
| 85% phosphoric acid | 0.005 |
| isophthalic acid | 12.00 |
| dimethylamine | 7.25 |
| 90% formic acid | 2.50 |

Here too, no heating was required to dissolve the solids. The properties of the resultant formulation at 30° C. were pH=7.32 and resistivity=73 ohm.cm.

EXAMPLE 4

The following formulation which was not according to the invention, was prepared:

| | |
|---|---|
| ethylene glycol | 57.75 wt. % |
| N-methylformamide | 14.00 |
| water | 4.50 |
| pelargonic acid | 0.50 |
| isophthalic acid | 16.00 |
| 85% phosphoric acid | 0.005 |
| dimethylamine | 7.25 |

This formulation was heated at 75° C. to dissolve the solids.

The resistivity of the resultant formulation at 30° C. was 150 ohm.cm.

The electrolytes of the formulation of Example 1 and Example 4 were tested in 55 V computer style electrolytic aluminum capacitors employing 90 EFV anodes and paper separators saturated with the electrolytes.

The capacitors were placed in an oven heated to 105° C. and the results after various periods of time are shown in the following table:

TABLE

EVALUATION OF LOW VOLT FILL ELECTROLYTES
CAPACITOR TEST DATA
105° C., 55 V DC

| | IL5 ma | | Cap. uF | | ESR, 120 Hz m.ohm | | ESR, 20 KHz m.ohm | |
|---|---|---|---|---|---|---|---|---|
| | Ex. 4 | Ex. 1 | Ex. 4 | Ex. 1 | Ex. 4 | Ex. 1 | Ex. 4 | Ex. 1 |
| Initial | .086 | .115 | 4521 | 4540 | 15.0 | 12.0 | 6.7 | 4.6 |
| 500 Hr. | .023 | .024 | 4382 | 4414 | 18.4 | 13.6 | 8.3 | 5.3 |
| 1000 | .023 | .023 | 4366 | 4376 | 18.8 | 13.6 | 8.5 | 5.4 |
| 1500 | .022 | .022 | 4343 | 4372 | 19.8 | 14.1 | 9.2 | 5.6 |
| 2000 | .024 | .026 | 4331 | 4358 | 20.9 | 14.6 | 9.6 | 5.9 |
| 2500 | .024 | .022 | 4316 | 4338 | 20.1 | 14.4 | 9.6 | 5.9 |

Notes:
1) IL5 = leakage current measured at 5 minutes after rated voltage is reached.
2) ESR = equivalent series resistance.
3) Capacitors were at room temperature, about 23° C. when measured.

These result show that the capacitors employing the electrolyte of the invention exhibit significantly improved operating characteristics.

I claim:

1. An electrolytic capacitor comprising aluminum anode and cathode members separated by an insulating spacer impregnated with an electrolyte consisting essentially of a solution containing from about 50%-70% by weight of N-methylformamide, up to about 30% by weight of a member selected from the group consisting of 2-methoxyethanol, 2-ethoxyethanol, ethylene glycol and 1,2-propylene glycol, about 12-20% by weight of an aromatic dicarboxylic acid selected from the group consisting of isophthalic acid and terephthalic acid, from 4% to 10% by weight of an amine selected from the group consisting of dimethylamine and monomethylamine, the mole ratio of the amine of the dicarboxylic acid being less than 2.00:1 and greater than 1.67:1, up to 0.5% by weight of pelargonic acid, up to 0.10% by weight of phosphoric acid and up to 8% by weight of water.

2. The electrolytic capacitor of claim 1 wherein up to about 25% of the aromatic dicarboxylic acid is replaced by an equivalent of formic acid.

3. An electrolytic capacitor comprising aluminum anode and cathode members separated by an insulating spacer impregnated with an electrolyte consisting essentially of a solution containing from about 50%-70% by weight of M-methylformamide, up to about 30% by weight of a glycol selected from the group consisting of ethylene glycol and 1,2-propylene glycol, about 12-20% by weight of an aromatic dicarboxylic acid selected from the group consisting of isophthalic acid and terephthalic acid, from 4% to 10% by weight of an amine selected from the group consisting of dimethylamine and monomethylamine, the mole ratio of the amine to the dicarboxylic acid being less than 2.00:1 and greater than 1.67:1, up to 0.5% by weight of pelargonic acid, up to 0.008% by weight of phosphoric acid and up to 8% by weight of water.

4. The electrolytic capacitor of claim 3 wherein 0.003%–0.008% by weight of phosphoric acid and 3%–6% by weight of water is present.

5. The electrolytic capacitor of claim 4 wherein the glycol is ethylene glycol.

6. The electrolytic capacitor of claim 5 wherein the amine is dimethylamine.

7. The electrolytic capacitor of claim 6 wherein the electrolyte consists essentially of about 56% by weight of N-methylformamide, about 16% by weight of ethylene glycol, about 4.5% by weight of water, about 0.25% by weight of pelargonic acid, about 0.0045% by weight of phosphoric acid, about 16% by weight of isophthalic acid and about 7.25% by weight of dimethylamine.

8. An electrolytic capacitor comprising aluminum anode and cathode members separated by an insulating spacer impregnated with an electrolyte consisting essentially of a solution containing from about 50%–70% by weight of N-methylformamide, up to about 30% by weight of a member selected from the group consisting of 2-methoxyethanol, 2-ethoxyethanol, ethylene glycol and 1,2-propylene glycol, about 12–20% by weight of an aromatic dicarboxylic acid selected from the group consisting of isophthalic acid and terephthalic acid, from 4% to 10% by weight of an amine selected from the group consisting of dimethylamine and monomethylamine, the mole ratio of the amine to the dicarboxylic acid being less than 2.00:1 and greater than 1.67:1, up to 2% by weight of a volatile aliphatic monocarboxylic acid, up to 0.10% by weight of phosphoric acid and up to 8% by weight of water.

9. An electrolyte particularly adapted for use in an electrolytic capacitor, said electrolyte consisting essentially of a solution containing from about 50%–70% by weight of N-methylformamide, up to about 30% by weight of a solvent selected from the group consisting of 2-methoxyethanol, ethylene glycol and 1,2-propylene glycol selected from the group consisting of ethylene glycol and 1,2-propylene glycol, about 12–20% by weight of an aromatic dicarboxylic acid selected from the group consisting of isophthalic acid and terephthalic acid, from 4% to 10% by weight of an amine selected from the group consisting of dimethylamine and monomethylamine, the mole ratio of the amine to the dicarboxylic acid being less than 2.00:1 and greater than 1.67:1, up to 0.5% by weight of pelargonic acid, up to 0.008% by weight phosphoric acid and up to 8% by weight of water.

10. An electrolytic capacitor comprising aluminum anode and cathode members separated by an insulating spacer impregnated with an electrolyte consisting essentially of a solution containing from about 50%–70% by weight of N-methylformamide, up to about 30% by weight of a member selected from the group consisting of 2-methoxyethanol, 2-ethoxyethanol, ethylene glycol and 1,2-propylene glycol, about 12–20% by weight of an aromatic dicarboxylic acid selected from the group consisting of isophthalic acid and terephthalic acid, from 4% to 10% by weight of an amine selected from the group consisting of dimethylamine and monomethylamine, the mole ratio of the amine to the dicarboxylic acid being less than 2.00:1 and greater than 1.67:1, up to 2% by weight of a volatile aliphatic monocarboxylic acid, up to 0.10% by weight of phosphoric acid and up to 8% by weight of water.

* * * * *